United States Patent
Herman et al.

(10) Patent No.: US 8,639,394 B2
(45) Date of Patent: Jan. 28, 2014

(54) DYNAMIC OPTICAL COUNTERMEASURES FOR GROUND LEVEL THREATS TO AN AIRCRAFT

(75) Inventors: Carl R. Herman, Owego, NY (US); Stephen C. Moraites, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 943 days.

(21) Appl. No.: 12/315,213

(22) Filed: Dec. 1, 2008

(65) Prior Publication Data

US 2011/0001062 A1    Jan. 6, 2011

(51) Int. Cl.
*G02F 1/00* (2006.01)

(52) U.S. Cl.
USPC ........... 701/3; 250/338.1; 250/492.1; 342/13; 342/14; 342/20

(58) Field of Classification Search
USPC ........ 701/2, 3, 4, 5, 6, 302; 250/492.1, 338.1; 342/13, 14, 15, 20
See application file for complete search history.

(56) References Cited

U.S. PATENT DOCUMENTS

| | | |
|---|---|---|
| 3,870,995 A | 3/1975 | Nielson |
| 3,897,150 A | 7/1975 | Bridges et al. |
| 3,905,035 A | 9/1975 | Krumboltz et al. |
| 3,944,167 A | 3/1976 | Figler et al. |
| 4,160,974 A * | 7/1979 | Stavis .............................. 342/63 |
| 4,460,240 A * | 7/1984 | Hudson ...................... 359/204.1 |
| 5,066,956 A | 11/1991 | Martin |
| 5,371,581 A * | 12/1994 | Wangler et al. ............... 356/5.01 |
| 5,430,810 A | 7/1995 | Saeki |
| 5,579,009 A | 11/1996 | Nilsson-Almqvist et al. |
| 5,742,384 A | 4/1998 | Farmer |
| 5,945,926 A | 8/1999 | Ammar et al. |
| 6,196,497 B1 | 3/2001 | Lankes et al. |
| 6,222,464 B1 * | 4/2001 | Tinkel et al. ................... 340/945 |
| 6,410,897 B1 * | 6/2002 | O'Neill ...................... 250/203.6 |
| 6,489,915 B1 | 12/2002 | Lines et al. |
| 6,650,407 B2 | 11/2003 | Jamieson et al. |
| 6,969,845 B2 | 11/2005 | von Rosenberg, Jr. |
| 6,980,152 B2 | 12/2005 | Steadman et al. |
| 6,985,212 B2 * | 1/2006 | Jamieson et al. ............. 356/5.01 |

(Continued)

FOREIGN PATENT DOCUMENTS

| | | |
|---|---|---|
| EP | 0655139 | 5/1995 |
| JP | 2001091650 | 4/2001 |
| WO | WO9219982 | 11/1992 |

OTHER PUBLICATIONS

U.S. Patent Appln. Publication No. US2006/0000988 A1, Published Jan. 5, 2006.

(Continued)

*Primary Examiner* — Thomas Black
*Assistant Examiner* — Peter D Nolan
(74) *Attorney, Agent, or Firm* — Tarolli, Sundheim, Covell & Tummino LLP

(57) ABSTRACT

Systems and methods are provided for mitigating optically aimed threats to an aircraft from the ground. A laser beam, having sufficient intensity to interfere with the vision of a human being, is projected from the aircraft over a defined scan pattern at ground level. At least one flight parameter is received. Each flight parameter represents one of a current orientation, position, and motion of the aircraft. The defined scan pattern is adjusted according to at least one flight parameter.

17 Claims, 3 Drawing Sheets

(56) References Cited

U.S. PATENT DOCUMENTS

| | | | | |
|---|---|---|---|---|
| 7,193,691 | B2* | 3/2007 | Weber | 356/5.01 |
| 7,282,695 | B2* | 10/2007 | Weber et al. | 250/225 |
| 7,378,626 | B2* | 5/2008 | Fetterly | 244/3.1 |
| 7,504,982 | B2* | 3/2009 | Berg et al. | 342/13 |
| 7,688,247 | B2* | 3/2010 | Anschel et al. | 342/14 |
| 7,830,299 | B2* | 11/2010 | Steele et al. | 342/22 |
| 7,925,159 | B2* | 4/2011 | Dove | 398/39 |
| 2005/0065668 | A1* | 3/2005 | Sanghera et al. | 701/3 |
| 2008/0018520 | A1* | 1/2008 | Moreau | 342/14 |
| 2008/0074306 | A1* | 3/2008 | Akerlund | 342/14 |
| 2009/0189785 | A1* | 7/2009 | Kravitz et al. | 340/945 |
| 2009/0250634 | A1* | 10/2009 | Chicklis et al. | 250/492.1 |

OTHER PUBLICATIONS

"Understanding NMD Technology", source(s): National Missile Defense: Policy Issues and Technological Capabilities.

"Effective Antenna Pattern of Scanning Radars", source(s): Zrnic, D.S.; Doviak, R.J.; Aerospace & Electronic Systems, IEEE Transactions on vol. AES-12, Issue 5, Sep. 1976 pp. 551-555 Digital Object Identifier 10.1109.TAES.1976.308254.

* cited by examiner

DYNAMIC OPTICAL COUNTERMEASURES FOR GROUND LEVEL THREATS TO AN AIRCRAFT

TECHNICAL FIELD

The present invention relates to electronic systems, and specifically relates to an optical countermeasures system for an aircraft.

BACKGROUND OF THE INVENTION

Aircraft are used in a wide variety of applications, both civilian and military, including travel, transportation, fire fighting, surveillance, and combat. Various aircraft have been designed to fill the wide array of functional roles defined by these applications, including balloons, dirigibles, traditional fixed wing aircraft, flying wings and helicopters.

In general, aircraft travel at a sufficient altitude to substantially eliminate any threat posed to the aircraft from threats posed by personnel on the ground. For some applications, however, it is necessary to travel at comparably low altitudes for long periods of time, exposing the aircraft to threats from the ground. Similar exposure takes place in other applications during take-offs and landings of the aircraft.

SUMMARY OF THE INVENTION

In accordance with one aspect of the present invention, a method is provided for mitigating threats to an aircraft that are located on the ground. A laser beam, having sufficient intensity to interfere with targeting of a weapon system, is projected from the aircraft over a defined scan pattern at ground level. At least one flight parameter is received. Each flight parameter represents one of a current orientation, position, and motion of the aircraft. The defined scan pattern is adjusted according to at least one flight parameter.

In accordance with another aspect of the present invention, an optical countermeasures system is provided for an aircraft. A laser scanning system is configured to project a laser beam, having sufficient intensity to interfere with targeting of a weapon system, from the aircraft to a point on the ground along respective ranges of azimuth and elevation angles to produce a scan pattern. A control system for the laser scanning system includes a scan pattern determination element configured to determine a desired scan pattern for the laser scanning system according to at least one flight parameter. Each flight parameter represents one of a current orientation, position, and motion of the aircraft the scan pattern. A scanner control is configured to instruct the laser scanning system to adjust its associated range of azimuth and elevation angles as to produce the desired scan pattern determined by the scan pattern determination element.

In accordance with yet another aspect of the present invention, a computer readable medium containing executable instructions is provided for controlling a scan pattern of an optical countermeasure device mounted on an aircraft. An aircraft systems interface is configured to receive at least one flight parameter. Each flight parameter represents one of a current orientation, position, and motion of the aircraft. A scan pattern determination element is configured to determine a desired scan pattern for the optical countermeasures device. A scanner interface is configured to provide appropriate instructions for a scanning element of the optical countermeasures system to generate the desired scan pattern.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

The present invention relates to systems and methods for protecting an aircraft from optically aimed threats located on the ground. For the purposes of this writing, the terms "optical" and "optically" are intended to refer to the use of light in the visible and near visible spectrum (e.g., infrared and ultraviolet). Accordingly, an optically aimed threat is a threat to an aircraft that targets an aircraft via the emission or reflection of visible, infrared, or ultraviolet light from the aircraft. It will be appreciated that a given threat can be configured to track an aircraft via any of a number of targeting modalities, including various automated systems, using optical sensors, human beings visually tracking the aircraft, and humans being assisted by equipment that improves the reception of visible light or allows for the viewing of light outside of the visible spectrum.

An optical countermeasures system can be implemented within the aircraft to interfere with one or both of optical sensors and human vision on the ground within a scan pattern of the optical countermeasures system. In accordance with an aspect of the present invention, the scan pattern of the optical countermeasures system can be dynamically altered in accordance with one or more parameters associated with the position, motion, and orientation of the aircraft as to maintain an effective scan pattern for the optical countermeasures system.

Figure 1:
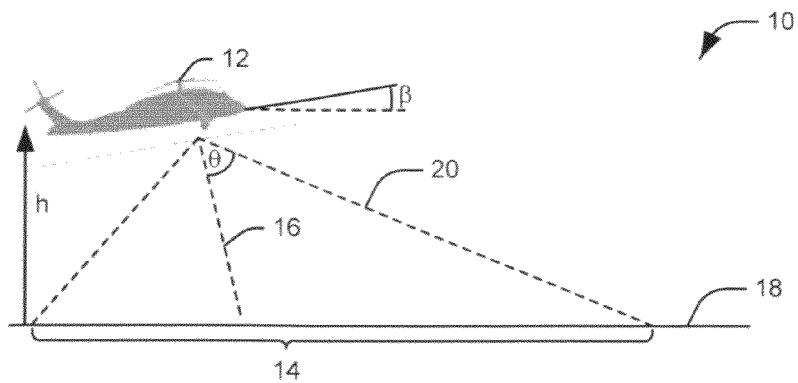
FIG. 1 illustrates an implementation of an optical countermeasures system on an aircraft in accordance with an aspect of the present invention.

FIG. 1 illustrates an implementation 10 of an optical countermeasures system on an aircraft 12 in accordance with an aspect of the present invention. The aircraft 12 is equipped with an optical countermeasures system that utilizes a projected laser beam of sufficient intensity as to interfere with the targeting of an optically aimed weapons system when its associated targeting modality (e.g., a sensor or human eye) is within the path of the beam. The optical countermeasure system can include various mechanical and/or adaptive optical components to allow the laser beam to progress over a limited range of azimuth and elevation angles such that the path of the laser beam through the progression of the scan is confined within a generalized cone 14 around an axis 16.

The base of the generalized cone 14, essentially the intersection of the generalized cone with a defined ground plane 18, is referred to herein as the scan pattern of the optical countermeasures system. In accordance with an aspect of the present invention, the shape and position of this scan pattern can be altered according to the one or more characteristics of the aircraft to maximize the effectiveness of the scan. In one implementation, these characteristics can include the altitude, h, the pitch angle, β, and the velocity of the aircraft.

The scan pattern can be shaped by altering the range of angles over which the laser beam is progressed. In one implementation, the alteration of the scan pattern can include changing an associated scan elevation angle, θ, of the optical countermeasures system, defined herein as the maximum elevation angle achieved in the scan. The scan elevation angle defines the angle between the axis 16 of the generalized cone 14, and a front wall 20 of the generalized cone along a cross section through the center of the aircraft 12. It will be appreciated that the laser beam, generally speaking, is visible from within the scan pattern and substantially invisible from outside of the scan pattern. Accordingly, in accordance with an aspect of the present invention, the position and shape of the scan pattern can be modified to maintain an effective intensity of the scanning laser within the entire visible region.

Figure 2:
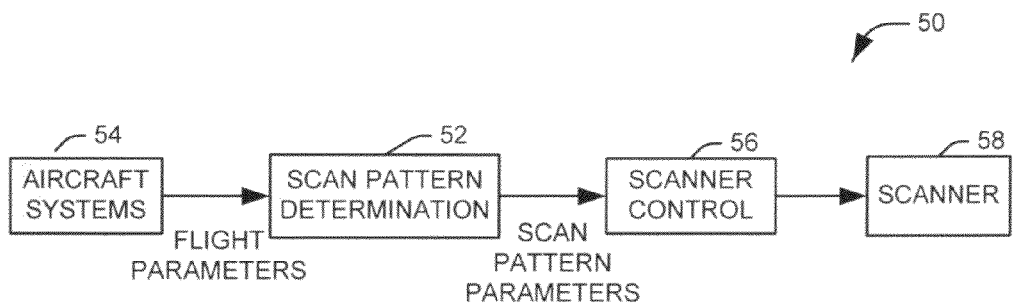
FIG. 2 illustrates an optical countermeasures system in accordance with an aspect of the present invention.

FIG. 2 illustrates an optical countermeasures system 50 in accordance with an aspect of the present invention. A scan pattern determination element 52 receives one or more flight parameters, representing the position, motion, and orientation of the aircraft, from various aircraft systems 54. For example, the flight parameters can include parameters representing the altitude, the velocity, the acceleration, the pitch, the roll, and the yaw of the aircraft.

The scan pattern determination element 52 calculates appropriate parameters defining the size and shape of a scan pattern from the flight parameters received from the aircraft systems 52. For example, in one implementation of the system 50, the scan pattern can comprise an ellipse, and the calculated parameters can include the respective semimajor and semiminor axes of the ellipse and a scan elevation angle associated with the optical countermeasures system. Alternatively, the calculated parameters can include the length and width of a rectangle, the base length and altitude of an isosceles triangle, or any other appropriate set of parameters defining a geometric figure. In accordance with an aspect of the invention, the width of a given scan pattern, that is the extension of the scan pattern to either side of the aircraft, can be varied inversely with the velocity of the aircraft, such that when the aircraft is moving sufficiently quickly to mitigate the effectiveness of attacks from the side, the scan pattern can be concentrated in the front and rear of the aircraft.

The calculated scan control parameters are then provided to a scanner control 56. The scanner control 56 provides appropriate instructions for a scanning element 58 of the optical countermeasures system to generate a scan pattern of the defined shape and size. For example, the scanner control 56 can alter an associated scan elevation angle of the system and the range of angles encompassed by the scan. The scanner control 56 is operative to provide the instructions dynamically, such that the scan pattern can updated immediately to reflect changes in the flight parameters.

The scanning element 58 is a structure operative to progress a projected laser beam across the ground as to substantially cover a desired scan pattern. For example, the laser beam can be reflected from one or more mirrors that can be rotated to change the orientation of the beam. Each of the one or more mirrors can have one or more axes of rotation, with each axis of rotation having a defined range of rotation, according to the defined scan pattern. In one implementation, a mirror, mounted on one or more motorized gimbals, can be utilized. The scanner control can instruct the one or more motors to alter the range of rotation associated with the gimbals, such that the rotational motion of the mirror is varied to progress the laser beam over the defined scan pattern.

Figure 3:
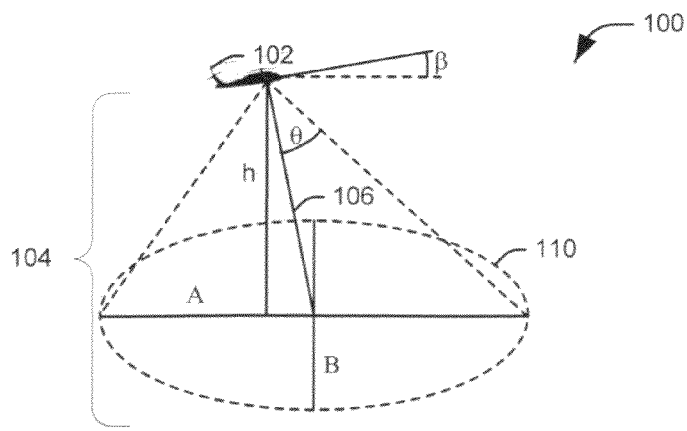
FIG. 3 illustrates an exemplary implementation of an optical countermeasures system on an aircraft in accordance with an aspect of the present invention.

FIG. 3 illustrates an exemplary implementation 100 of an optical countermeasures system on an aircraft 102 in accordance with an aspect of the present invention. The aircraft 102 is equipped with an optical countermeasures system that utilizes a projected laser beam of sufficient intensity as to interfere with the effectiveness of individuals and sensors within the path of the beam. The optical countermeasure system can include various mechanical and/or adaptive optical components to allow the laser beam to progress over a limited range of angles such that the path of the laser beam through the progression of the scan is confined within an elliptical cone 104 having an axis 106. The elliptical base of the cone 104, essentially the intersection of the elliptical cone with a defined ground plane 108, is referred to herein as the scan pattern 110 of the optical countermeasures system.

In the illustrated implementation, the size and eccentricity of the elliptical scan pattern 110 can be altered according to the altitude, speed, and pitch of the aircraft. It will be appreciated that other parameters can be taken into consideration when determining the scan angle, such as a maximum effective range for expected ground-based threats to the aircraft and a maximum effective range of the optical countermeasures system. It will be appreciated that these parameters can be variable. For example, the threat range can be adjusted according to available intelligence on threats to the aircraft. Tables containing values for the threat range and the effective range for the optical countermeasures system can be stored in an associated memory.

In one implementation, the scan elevation angle, θ, can be varied as a function of the altitude, h, the maximum expected threat range, $R_T$, and the maximum effective range of the system, $R_S$, such that a reference point on the edge of the scan pattern forward of the aircraft is maintained at a distance approximately equal to the lesser of the maximum effective range of the system and the maximum expected threat range. In this implementation, the scan elevation angle can be calculated as:

$$\theta = \cos^{-1}\left(\frac{h}{\min(R_T, R_S)}\right) \qquad \text{Eq. 1}$$

The calculated scan elevation angle can be adjusted for the pitch, β, for example, by subtracting the determined pitch value from the calculated scan elevation angle to produce a scan value for the system. Accordingly, the extension of the scan pattern forward of the aircraft can be tightly controlled to maximize the effectiveness of the optical countermeasures system.

Similarly, the eccentricity of the elliptical scan pattern 110 can be changed in accordance with the velocity of the aircraft 102. Values for the semimajor axis, A, and the semiminor axis, B, can be determined, for example, as functions, for example, linear functions, of a velocity, v, of the aircraft, such that the elliptical scan pattern can be represented as:

$$\frac{x^2}{A(v)^2} + \frac{y^2}{B(v)^2} = 1 \qquad \text{Eq. 2}$$

This allows laser energy from the scanner to be concentrated in the front and the rear of the aircraft when the aircraft is moving at sufficient velocity to make targeting the aircraft from the side unlikely to be successful.

Figure 4:
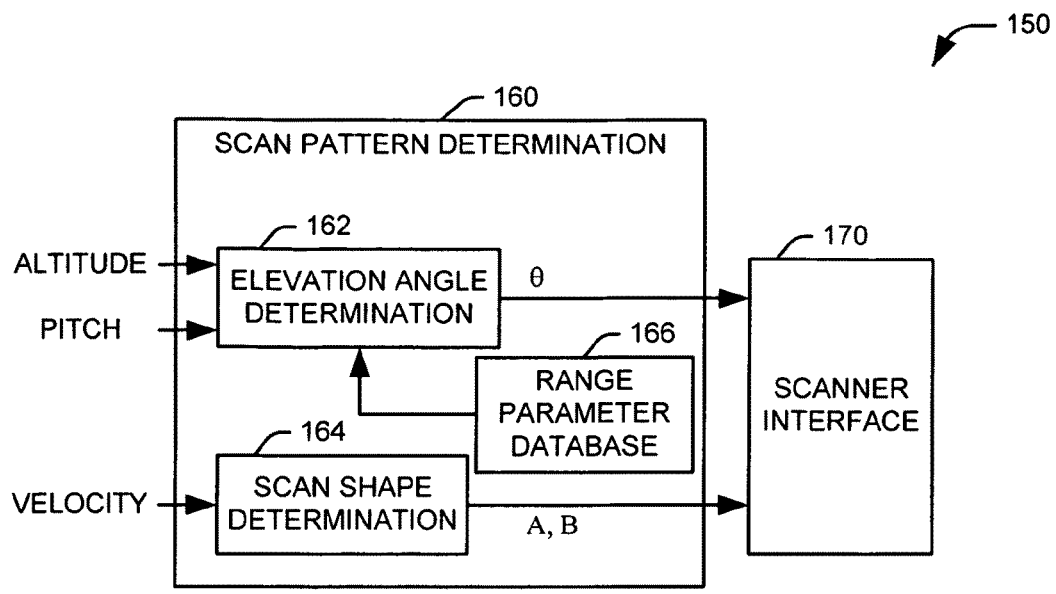
FIG. 4 illustrates a functional block diagram of one implementation of a scan pattern determination element in accordance with an aspect of the present invention.

FIG. 4 illustrates a functional block diagram of one implementation of an optical countermeasures system 150 in accordance with an aspect of the present invention. It will be appreciated that the scan pattern determination element 160, each of the elements 162, 164, and 166 comprising the scan pattern determination element, and the scanner interface 170 can be implemented as dedicated hardware, software embedded on a computer readable medium and executed by a computer processor, or some combination thereof.

The scan pattern determination element 160 receives data from one or more aircraft systems, and defines an elliptical scan pattern based upon this information. In the illustrated implementation, parameters representing the altitude and pitch of the aircraft are received at an elevation angle determination element 162. The elevation angle determination element 162 determines an appropriate scan angle for the device from the received pitch and altitude as well as one or more range parameters stored in an associated database 164. For example, the database 164 can contain one or more parameters associated with each of the effective range of the optical counter measures systems and the effective range of expected threats to the aircraft. In the illustrated implementation, the scan elevation angle, θ, can be determined as:

$$\theta = \cos^{-1}\left(\frac{h}{\min(R_T, R_S)}\right) - \beta \qquad \text{Eq. 3}$$

where h is the altitude of the aircraft, $R_T$ is the effective range of expected threats to the aircraft, $R_S$ is the effective range of the optical countermeasures system, and β is the pitch of the aircraft.

In the illustrated implementation, a parameter representing the velocity of the aircraft is received at a scan shape determination element 166. The scan shape determination element 166 determines the eccentricity of the elliptical scan pattern according to the velocity of the aircraft. Specifically, as the velocity of the aircraft increases, the semiminor axis of the elliptical scan pattern can be decreased and the semimajor axis of the scan pattern can be increased, such that the ellipse can be represented as:

$$\frac{x^2}{A(v)^2} + \frac{y^2}{B(v)^2} = 1 \qquad \text{Eq. 4}$$

where v is the velocity, x represents a first coordinate axis running parallel to the ground plane from the rear of the aircraft to the front of the aircraft, y represents a second coordinate axis orthogonal to the first coordinate axis and running parallel to the ground plane, A(v) is the semimajor axis, and B(v) is the semiminor axis.

This allows the scan pattern to be concentrated into the region in the front and rear of the aircraft when the aircraft is travelling at full speed.

The determined scan pattern is then provided to the scanner control 170. The scanner control 170 converts the parameters defining the scan pattern into data in an appropriate format for a scanning element (not shown) associated with the optical countermeasures system. For example, the scanner control 170 can calculate various ranges of angles over which one or more mirrors associated with the scanning element can be rotated to progress the laser beam across the area defined by the scan pattern. This data can be continuously passed to the scanning element such that the projected scan pattern can be dynamically altered as the motion, orientation, and position of the aircraft changes.

Figure 5:
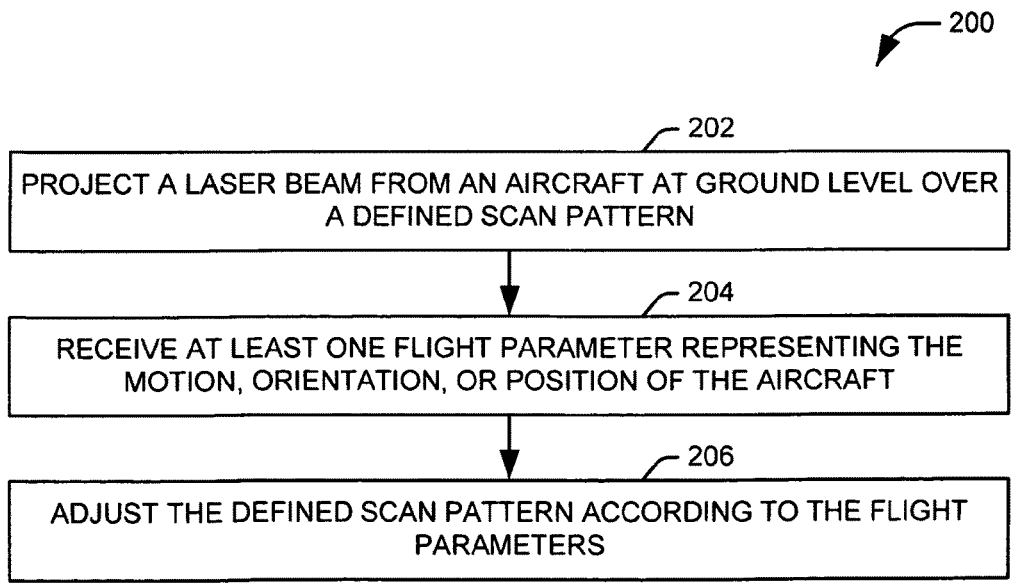
FIG. 5 illustrates a method for mitigating threats located on the ground to an aircraft from the air.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates a method 200 for mitigating threats to an aircraft from the ground. At 202, a laser beam, having sufficient intensity to interfere with targeting of a weapon system, is projected from the aircraft over a defined scan pattern at ground level. For example, a laser beam can be reflected from one or more rotating mirrors. Each mirror can be controlled by one or more motors to allow for rotation of the mirrors in one or more directions. In one implementation, a mirror can be mounted on a gimbal assembly that allows a motor to rotate the mirror along at least one axis. In this manner, an elevation angle and an azimuth angle of the laser beam can be controlled to project the laser over a desired region.

At 204, at least one flight parameter is received from an aircraft system. Each flight parameter can represent one of a current orientation, position, and motion of the aircraft. These flight parameters can include parameters representing the altitude, the velocity, the acceleration, the pitch, the roll, and the yaw of the aircraft. At step 206, the defined scan pattern is adjusted according to the flight parameters. For example, the width of the scan pattern can be adjusted according to the velocity of the aircraft, such that the width of the scan pattern varies inversely with the velocity of the aircraft. In one implementation, the scan pattern is elliptical, and the width of the scan pattern is represented by a semimajor axis of the elliptical scan pattern.

In another implementation, a scan elevation angle associated with the scan pattern can be varied inversely with the altitude of the aircraft as to maintain the position of a reference point forward of the aircraft on the outer edge of the scan pattern at a predetermined distance from the aircraft. The pitch of the aircraft can also be taken account in maintaining the position of the reference point, such that the scan elevation angle varies with the pitch. The predetermined distance can be determined, for example, from a maximum effective range of the laser scanning system and a maximum range of expected threats to the aircraft.

Figure 6:
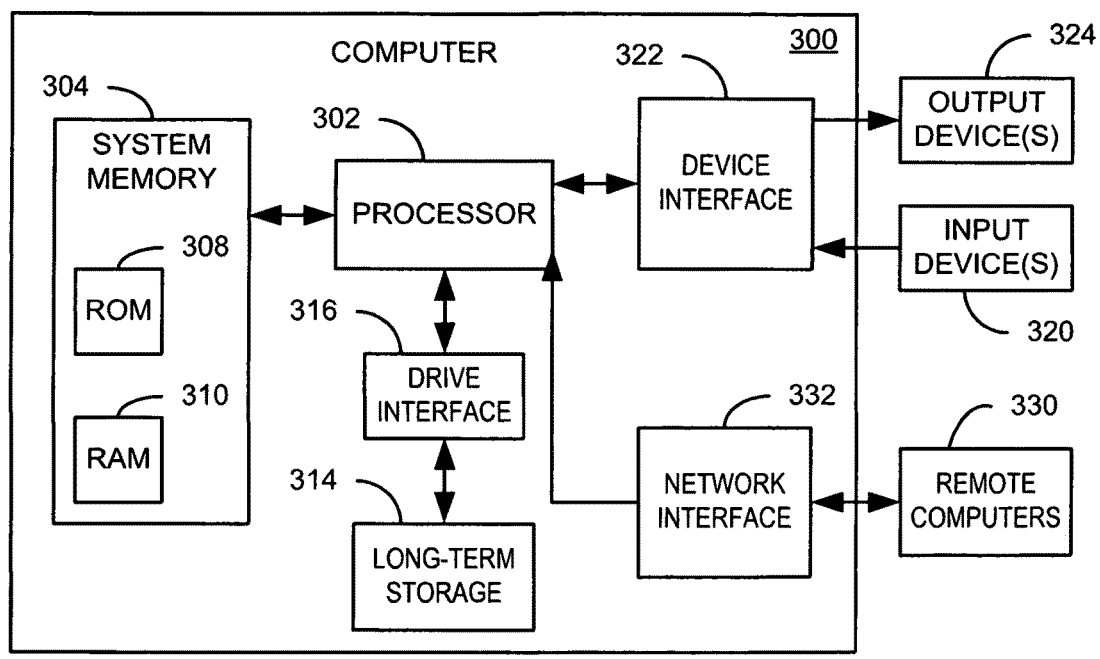
FIG. 6 illustrates a computer system that can be employed to implement systems and methods described herein, such as based on computer executable instructions running on the computer system.

FIG. 6 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer- aided engineering (CAE) tool running computer executable instructions to perform a method as described herein.

The computer system 300 includes a processor 302 and a system memory 304. Dual microprocessors and other multiprocessor architectures can also be utilized as the processor 302. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

A user may enter commands and information into the computer system 300 through one or more input devices 320, such as a keyboard or a pointing device (e.g., a mouse). These and other input devices are often connected to the processor 302 through a device interface 322. For example, the input devices can be connected to the system bus by one or more a parallel port, a serial port or a universal serial bus (USB). One or more output device(s) 324, such as an optical display device or printer, can also be connected to the processor 302 via the device interface 322.

The computer system 300 may operate in a networked environment using logical connections (e.g., a local area network (LAN) or wide area network (WAN) to one or more remote computers 330. A given remote computer 330 may be a workstation, a computer system, a router, a peer device or other common network node, and typically includes many or all of the elements described relative to the computer system 300. The computer system 300 can communicate with the remote computers 330 via a network interface 332, such as a wired or wireless network interface card or modem. In a networked environment, application programs and program data depicted relative to the computer system 300, or portions thereof, may be stored in memory associated with the remote computers 330.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim the following:

1. A method for mitigating optically aimed threats to an aircraft that are located on the ground, comprising:
projecting a single laser beam, having sufficient intensity to interfere with targeting of a weapon system, from an optical countermeasures system on the aircraft over an entirety of a defined scan pattern at ground level, wherein the defined scan pattern comprises a region that is in front of and behind the aircraft;
receiving at least one flight parameter, each flight parameter representing one of a current orientation, position, and motion of the aircraft; and
adjusting the defined scan pattern according to the at least one flight parameter.

2. The method of claim 1, the at least one flight parameter comprising a velocity of the aircraft.

3. The method of claim 2, wherein adjusting the defined scan pattern comprises adjusting the width of the scan pattern according to the velocity of the aircraft.

4. The method of claim 3, wherein the scan pattern is elliptical, and adjusting the width of the scan pattern comprises varying a semiminor axis of the elliptical scan pattern inversely with the velocity of the aircraft.

5. The method of claim 1, wherein adjusting the defined scan pattern comprises instructing at least one motor to alter a range of rotation of respective gimbals associated with each of the at least one motor, such that the rotational motion of a mirror mounted on the at least one gimbal is varied to progress the laser beam over the defined scan pattern.

6. The method of claim 1, the at least one flight parameter comprising an altitude of the aircraft.

7. The method of claim 6, wherein adjusting the defined scan pattern comprises varying a scan elevation angle associated with the scan pattern inversely with the altitude of the aircraft, such that the position of a reference point forward of the aircraft on the outer edge of the scan pattern remains at a predetermined distance from the aircraft.

8. The method of claim 1, the at least one flight parameter comprising a pitch of the aircraft.

9. The method of claim 8, wherein adjusting the defined scan pattern comprises varying a scan elevation angle associated with the scan pattern inversely with the pitch of the aircraft, such that the position of a reference point forward of the aircraft on the outer edge of the scan pattern remains at a predetermined distance from the aircraft.

10. An optical countermeasures system for an aircraft comprising:
a laser scanning system configured to project a laser beam, having sufficient intensity to interfere with targeting of a weapon system, from the aircraft to a point on the ground along respective ranges of azimuth and elevation angles to produce a scan pattern; and
a control system for the laser scanning system, comprising:
a scan pattern determination element configured to determine a desired scan pattern for the laser scanning system according to at least one flight parameter, each flight parameter representing one of a current orientation, position, and motion of the aircraft, the scan pattern determination element comprising a range parameter table that stores at least one of a maximum effective range of the laser scanning system and a maximum range of expected threats to the aircraft, the scan pattern determination element being further configured to determine the desired scan pattern such that the position of a reference point forward of the aircraft on the outer edge of the scan pattern remains substantially within a selected one of the maximum effective range of the laser scanning system and the maximum range of expected threats to the aircraft; and
a scanner control configured to instruct the laser scanning system to adjust its associated range of azimuth and elevation angles as to produce the desired scan pattern determined by the scan pattern determination element.

11. The system of claim 10, the scan pattern determination element comprising an elevation angle determination element configured to determine a maximum elevation angle defining the desired scan pattern according to the at least one flight parameter.

12. The system of claim 11, the at least one flight parameter comprising at least one of a pitch of the aircraft and an altitude of the aircraft.

13. The system of claim 10, the scan pattern determination element comprising a scan shape determination element configured to determine a shape of the desired scan pattern.

14. The system of claim 13, the at least one flight parameter comprising a velocity of the aircraft.

15. A non-transitory computer readable medium containing executable instructions for controlling a scan pattern of an optical countermeasures device mounted on an aircraft, the executable instructions comprising:
    an aircraft systems interface configured to receive at least one flight parameter, each flight parameter representing one of a current orientation, position, and motion of the aircraft, the at least one flight parameter comprising at least one of a pitch of the aircraft, an altitude of the aircraft, and a velocity of the aircraft;
    a scan pattern determination element configured to determine a desired scan pattern for the optical countermeasures device, the scan parameter determination element being configured to calculate a scan elevation angle associated with the desired scan pattern as the arccosine of the ratio of the altitude of the aircraft to the lesser of a maximum effective range of the optical countermeasures device and a maximum range of expected threats to the aircraft; and
    a scanner interface configured to provide appropriate instructions for a scanning element of the optical countermeasures system to generate the desired scan pattern.

16. The computer readable medium of claim 15, the scan parameter determination element being configured to determine a shape of the desired scan pattern according to the velocity of the aircraft.

17. A method for mitigating optically aimed threats to an aircraft that are located on the ground, comprising:
    projecting a laser beam, having sufficient intensity to interfere with targeting of a weapon system, from the aircraft over a defined scan pattern at ground level;
    receiving at least one flight parameter, each flight parameter representing one of a current orientation, position, and motion of the aircraft, the at least one flight parameter comprising a velocity of the aircraft; and
    adjusting the defined scan pattern according to the at least one flight parameter, wherein adjusting the defined scan pattern comprises adjusting the width of the scan pattern according to the velocity of the aircraft,
    wherein the scan pattern is elliptical, and adjusting the width of the scan pattern comprises varying a semiminor axis of the elliptical scan pattern inversely with the velocity of the aircraft.

* * * * *